United States Patent
Kogo (10) Patent No.: US 11,328,099 B2
(45) Date of Patent: May 10, 2022

(54) THERMAL MODEL CREATION DEVICE, METHOD, AND PROGRAM OF BUILDING

(71) Applicant: NEC Corporation, Tokyo (JP)

(72) Inventor: Takuma Kogo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 726 days.

(21) Appl. No.: 16/072,564

(22) PCT Filed: Mar. 22, 2017

(86) PCT No.: PCT/JP2017/011451
§ 371 (c)(1),
(2) Date: Jul. 25, 2018

(87) PCT Pub. No.: WO2017/170039
PCT Pub. Date: Oct. 5, 2017

(65) Prior Publication Data
US 2019/0034560 A1 Jan. 31, 2019

(30) Foreign Application Priority Data

Mar. 31, 2016 (JP) .............................. JP2016-070979

(51) Int. Cl.
*G06F 30/00* (2020.01)
*F24F 11/72* (2018.01)
*F24F 11/63* (2018.01)
*G06F 111/10* (2020.01)

(52) U.S. Cl.
CPC ............. *G06F 30/00* (2020.01); *F24F 11/63* (2018.01); *F24F 11/72* (2018.01); *G06F 2111/10* (2020.01)

(58) Field of Classification Search
CPC ....... G06F 30/00; G06F 2111/10; F24F 11/63; F24F 11/72
See application file for complete search history.

(56) References Cited

U.S. PATENT DOCUMENTS

| | | | |
|---|---|---|---|
| 2013/0218924 A1 | 8/2013 | Kim et al. | |
| 2016/0018124 A1* | 1/2016 | Yamamoto | G05B 13/026 700/276 |
| 2019/0017721 A1* | 1/2019 | Motodani | F24F 11/64 |

FOREIGN PATENT DOCUMENTS

| | | |
|---|---|---|
| JP | H08-240335 A | 9/1996 |
| JP | 2001-344294 A | 12/2001 |
| JP | 2013-171579 A | 9/2013 |
| JP | 2015-230128 A | 12/2015 |

(Continued)

OTHER PUBLICATIONS

Luo et al. "Building Thermal Network Model and Application to Temperature Regulation". 2010 IEEE International Conference on Control Applications Part of 2010 IEEE Multi-Conference on Systems and Control Yokohama, Japan, Sep. 8-10, 2010. pp. 2190-2195. (Year: 2010).*

(Continued)

*Primary Examiner* — Eunhee Kim
(74) *Attorney, Agent, or Firm* — Sughrue Mion, PLLC (57) ABSTRACT

There is provided a thermal model creation device capable of creating a highly accurate thermal model. A constraint-condition setting means 72 sets constraint conditions of parameters in the thermal model. A parameter determination means 73 determines all unknown values of parameters in the thermal model under the constraint conditions.

10 Claims, 4 Drawing Sheets

(56) References Cited

FOREIGN PATENT DOCUMENTS

WO    2014174871 A1    10/2014

OTHER PUBLICATIONS

Goyal et al. "Identification of multi-zone building thermal interaction model from data". 2011 50th IEEE Conference on Decision and Control and European Control Conference (CDC-ECC) Orlando, FL, USA, Dec. 12-15, 2011. pp. 181-186. (Year: 2011).*
Huang et al. "A neural network-based multi-zone modelling approach for predictive control system design in commercial buildings". Energy and Buildings 97 (2015) pp. 86-97. (Year: 2015).*
Witrant et al. "A Hybrid Model and MIMO Control for Intelligent Buildings Temperature Regulation over WSN". IFAC TDS 2009—8th IFAC Workshop on Time Delay system. 2010. 7 Pages. (Year: 2010).*
International Search Report for PCT Application No. PCT/JP2017/011451, dated Jun. 27, 2017.
Written opinion for PCT Application No. PCT/JP2017/011451.

\* cited by examiner

|   | 1 | 2 | 3 | 4 | 5 | 6 | 7 | ... |
|---|---|---|---|---|---|---|---|-----|
| 1 | 1 | 1 | 0 | 0 | 0 | 1 | 1 | ... |
| 2 | 1 | 1 | 1 | 0 | 0 | 1 | 1 | ... |
| 3 | 0 | 1 | 1 | 1 | 0 | 0 | 1 | ... |
| 4 | 0 | 0 | 1 | 1 | 1 | 0 | 0 | ... |
| 5 | 0 | 0 | 0 | 1 | 1 | 0 | 0 | ... |
| 6 | 1 | 1 | 0 | 0 | 0 | 1 | 1 | ... |
| 7 | 1 | 1 | 1 | 0 | 0 | 1 | 1 | ... |
| : | : | : | : | : | : | : | : |     |

FIG. 5

| | PERIMETER/NON-PERIMETER | ROOM |
|---|---|---|
| 1 | 0 | 0 |
| 2 | 0 | 0 |
| 3 | 0 | 0 |
| 4 | 0 | 0 |
| 5 | 1 | 0 |
| 6 | 0 | 1 |
| 7 | 0 | 0 |
| 8 | 0 | 0 |
| 9 | 0 | 0 |
| 10 | 1 | 1 |
| 11 | 1 | 1 |
| 12 | 1 | 0 |
| ⋮ | ⋮ | ⋮ |

THERMAL MODEL CREATION DEVICE, METHOD, AND PROGRAM OF BUILDING

This application is a National Stage Entry of PCT/JP2017/011451 filed on Mar. 22, 2017, which claims priority from Japanese Patent Application 2016-070979 filed on Mar. 31, 2016, the contents of all of which are incorporated herein by reference, in their entirety.

TECHNICAL FIELD

The present invention relates to a thermal model creation device, a thermal model creation method, and a thermal model creation program for creating a thermal model representing temperature changes of zones defined by air conditioning zoning.

BACKGROUND ART

Floors in an office building or the like are divided into a plurality of zones by air conditioning zoning at the time of, for example, designing the building.

Generally, a worker who works on a floor of the building set the temperature of an air conditioning system to a desired temperature. However, in actuality, the temperature of the zone in which the worker is present does not become the temperature desired by the worker. This is because the actual temperature depends not only on the set temperature of the air conditioning system but also on various factors such as the influence from surrounding zones.

Patent Literature 1 discloses that a time-unit-heat-load generation model is created by calculating thermal load of the entire building at each time using an air conditioning heat load model.

Furthermore, Patent Literature 2 discloses a building information modeling (BIM) data supply system including a BIM server and a client.

CITATION LIST

Patent Literature

PTL 1: Japanese Patent Application Laid-Open No. H08-240335
PTL 2: Japanese Patent Application Laid-Open No. 2013-171579

SUMMARY OF INVENTION

Technical Problem

The inventor of the present invention considered that if temperature change of a zone was able to be represented by one or more numerical expressions including explanatory variables and parameters, the temperature of the zone in the future could be predicted. Furthermore, the inventor of the present invention considered that if, among the explanatory variables, the values of explanatory variables representing controllable events was able to be controlled, the temperature of the zone could be controlled to a desired temperature. In order to achieve them, it is necessary to create one or more numerical expressions described above (hereinafter referred to as a "thermal model").

However, the thermal model includes a large number of parameters. Examples of parameters include a parameter specific to a zone, and a parameter corresponding to a combination of zones. An example of a parameter specific to a zone is a parameter related to heat transfer by a temperature gradient between the zone and the outside air. The value of such a parameter specific to a zone needs to be determined for each zone. In addition, an example of a parameter corresponding to a combination of zones is a parameter related to heat transfer by a temperature gradient between the zones. Such a parameter corresponding to a combination of zones needs to be determined for each combination of zones. Thus, as the number of zones increases, the number of parameters the values of which need to be determined increases.

It can be said that creating a thermal model is to determine the values of all these parameters. However, when the values of parameters in a thermal model are determined by a method such as parameter estimation, combinations of values of parameters that cancel each other are derived at the time of estimating parameters if the number of parameters is very large. As a result, the accuracy of the thermal model decreases.

Thus, the present invention is to provide a thermal model creation device, a thermal model creation method, and a thermal model creation program that are capable of creating a highly accurate thermal model.

Solution to Problem

A thermal model creation device according to the present invention is a thermal model creation device that creates a thermal model representing temperature changes of zones using numerical expressions including explanatory variables and parameters, the device including a constraint-condition setting means for setting constraint conditions of the parameters in the thermal model, and a parameter determination means for determining all unknown values of parameters in the thermal model under the constraint conditions.

A thermal model creation method according to the present invention is a thermal model creation method for creating a thermal model representing temperature changes of zones using numerical expressions including explanatory variables and parameters, the method including setting constraint conditions of the parameters in the thermal model, and determining all unknown values of parameters in the thermal model under the constraint conditions.

Also, a thermal model creation program according to the present invention is a thermal model creation program installed in a computer that creates a thermal model representing temperature changes of zones using numerical expressions including explanatory variables and parameters, the program causing the computer to execute constraint condition setting processing for setting constraint conditions of the parameters in the thermal model, and parameter determination processing for determining all unknown values of parameter in the thermal model under the constraint conditions.

Advantageous Effects of Invention

According to the present invention, it is possible to create a highly accurate thermal model.

DESCRIPTION OF EMBODIMENTS

Hereinafter, an exemplary embodiment of the present invention is described with reference to the drawings.

Figure 1:
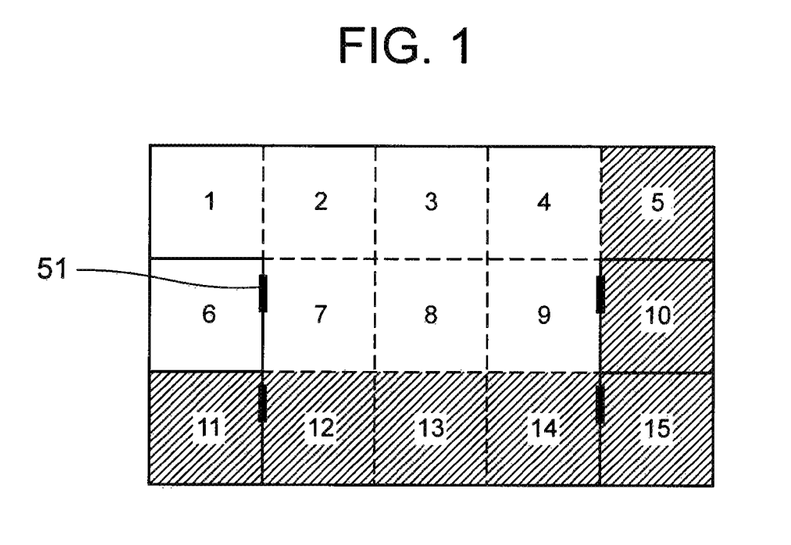
[FIG. 1] It depicts a schematic diagram showing an example of a plurality of zones defined by air conditioning zoning.

First, a zone is described. A zone is an individual area obtained by dividing a floor by air conditioning zoning. The air conditioning zoning is performed by a designer at the time of, for example, designing a building. FIG. 1 depicts a schematic diagram showing an example of a plurality of zones defined by air conditioning zoning. FIG. 1 exemplifies 15 zones, and respective zones shown in FIG. 1 are identified by reference signs of 1 to 15.

Two adjacent zones may be separated by a structure (specifically a wall) blocking the flow of air, or may be unseparated by a wall. In FIG. 1, the boundaries each having a wall among the boundaries of zones are indicated by solid lines, and the boundaries having no wall are indicated by broken lines. Note that, partitions do not block the flow of air in the zones, and do not correspond to walls. In addition, the zones surrounded by walls (the zones 6, 10, 11, and 15 in the example shown in FIG. 1) are each provided with a door 51.

Furthermore, zones in which the temperature is easily affected by the outside air temperature, solar radiation, and the like are referred to as perimeter zones. Then, zones other than the perimeter zones are referred to as non-perimeter zones. For example, when designing the building, the designer determines respective zones as perimeter zones or non-perimeter zones. For example, the temperature of a zone in which a glass window is provided between the zone and the outside air is easily affected by the outside air temperature, solar radiation, and the like. Thus, the zone is determined as a perimeter zone. In the example shown in FIG. 1, the perimeter zones are indicated by diagonal lines and the non-perimeter zones are indicated in white. Zones that can be perimeter zones are the zones along the outer wall of the building.

In FIG. 1, the zones each have a quadrangular shape and have the same area, but the shape and area of each zone may be different from each other. The number of zones is not particularly limited.

Figure 2:
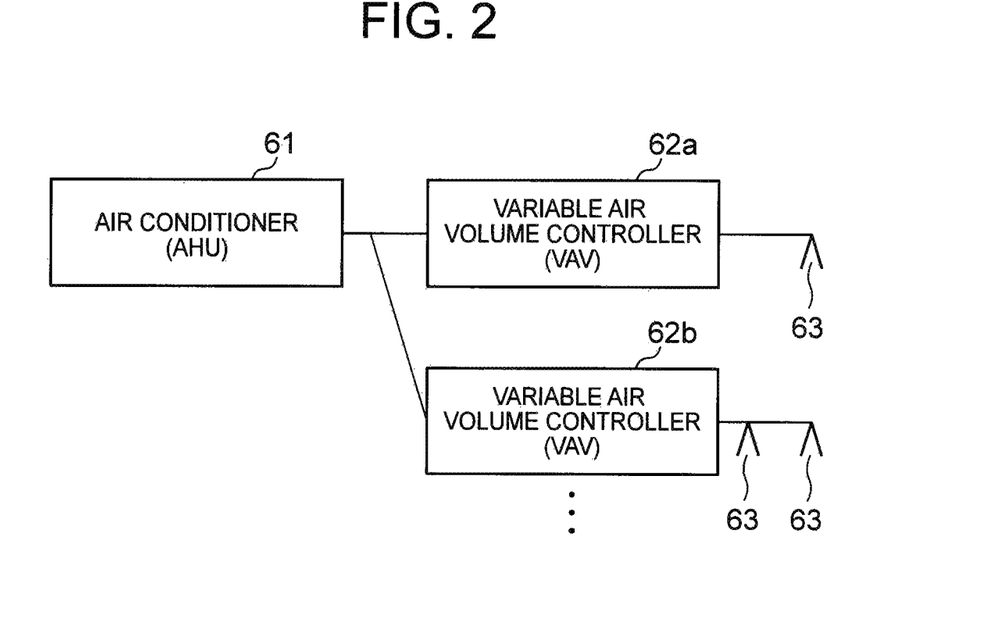
[FIG. 2] It depicts a schematic diagram showing an example of an air conditioner and a variable air volume controller.

FIG. 2 depicts a schematic diagram showing an example of an air conditioner and a variable air volume controller. Hereinafter, an air conditioner is referred to as an air handling unit (AHU). A variable air volume controller is referred to as a variable air volume (VAV).

An AHU 61 is connected with a plurality of VAVs 62. The respective VAVs 62 correspond to the respective zones on a one-to-one basis. The respective VAVs 62 are to be distinguished by reference signs with suffixes such as "62a", "62b", and the like. The number of VAVs 62 connected with the AHU 61 is not particularly limited.

Here, it has been described that the respective VAVs 62 correspond to the respective zones on a one-to-one basis to simplify the description, but the respective VAVs 62 may not correspond to the respective zones on a one-to-one basis. Specifically, a VAV 62 may supply air to a plurality of zones.

The AHU 61 supplies air of a set temperature to the zones via the VAVs 62. For example, it is assumed that the VAV 62a corresponds to the zone 1 and that the VAV 62b corresponds to the zone 2. The AHU 61 supplies air of the set temperature to the zone 1 via the VAV 62a and supplies it to the zone 2 via the VAV 62b. The supply air temperature for each zone depends on the AHU 61 that supplies air to the VAV 62 corresponding to each zone. That is, when one AHU 61 supplies air to a plurality of zones, the supply air temperature for the plurality of zones is common. Thus, the supply air temperature for the zones 1 and 2 is common in the above example. Furthermore, the supply air temperature of the AHU 61 is controllable.

The VAV 62 is supplied with air from the AHU 61 and supplies the air to the corresponding zone. The VAV 62 is a device that controls the air volume when supplying air to the corresponding zone. The air volume is controllable, and the VAV 62 supplies air to the corresponding zone with a set air volume.

The VAV 62 is provided with an air outlet 63 for supplying air to the corresponding zone. The air outlet 63 of the VAV 62 is provided in the zone corresponding to the VAV 62. The number of air outlets 63 provided to the VAV 62 may be different for each VAV 62. For example, FIG. 2 exemplifies the case in which the VAV 62a is provided with one air outlet 63 and the VAV 62b is provided with two air outlets 63. The air volume when one VAV 62 supplies air to a zone is the total supply air volume from the air outlets 63 of the VAV 62. Thus, the air volume when one VAV 62 supplies air to a zone does not depend on the number of air outlets 63 provided to the VAV 62.

In addition, FIG. 2 shows one AHU 61, but a plurality of AHUs 61 may be provided. For example, the first AHU 61 may supply air of the temperature $T_1$ to the zones 1, 2, and the like, and the second AHU 61 may supply air of the temperature $T_2$ to the zones 6, 7, and the like.

The thermal model creation device of the present invention creates a thermal model representing temperature changes of zones using numerical expressions including explanatory variables and parameters. The thermal model is one or more numerical expressions representing the temperature change of each zone.

The present exemplary embodiment exemplifies a case in which the temperature change of each zone is represented in the form of Expression (1) shown below and the thermal model is a set of expressions in the form of Expression (1) corresponding to respective zones. However, the representation form of the thermal model is not limited to this example.

[Expression 1]

$$\dot{T}^j = \sum_{i \in Z} c_{ac}^{i,j} Q_{ac}^i(t)(T_{ac}^i(t) - T^j(t)) + \sum_{i \in Z} c_z^{i,j}(T^i(t) - T^j(t)) + \\ c_{oa}^j(T_{oa}(t) - T^j(t)) + c_{sr}^j I(t) + c_{hh} O^j(t) + c_{dh} E^j(t) \quad (1)$$

In Expression (1), i and j are variables each indicating a zone identification number.

Hereinafter, a zone identified by the identification number i is referred to as a zone i. A focused zone is referred to as a zone j.

When there are fifteen zones as described above, the thermal model creation device of the present exemplary embodiment creates a thermal model constituted by fifteen numerical expressions represented in the form of Expression (1). Each of these 15 numerical expressions represents temperature change of the corresponding zone.

The thermal model creation device of the present invention sets constraint conditions for parameters in the thermal model and determines the values of parameters in the thermal model by parameter estimation (for example, the least squares method) under the constraint conditions.

Explanatory variables included in Expression (1) are described. In Expression (1), $T^i(t)$, $T^j(t)$, $Q_{ac}^i(t)$, $T_{ac}^i(t)$, $T_{oa}(t)$, $I(t)$, $O^j(t)$, and $E^j(t)$ are the explanatory variables.

$T^i(t)$ is the temperature of the zone i at time t. Thus, the temperature of the focused zone j at time t is represented as $T^j(t)$.

$Q_{ac}^i(t)$ is the air volume supplied to the zone i by the VAV 62 corresponding to the zone i at time t.

$T_{ac}^i(t)$ is the temperature of the air supplied, from the AHU 61 connected with the VAV 62 corresponding to the zone i, to the zone i via the VAV 62 at time t.

$T_{oa}(t)$ is the outside air temperature at time t.

$I(t)$ is the solar radiation amount at time t.

$O^j(t)$ is the number of people in the zone j at time t.

$E^j(t)$ is the power consumption of the electrical devices existing in the zone j at time t.

$T_{oa}(t)$ and $I(t)$ do not depend on zones.

Parameters included in Expression (1) are described. In Expression (1), $c_{ac}^{i,j}$, $c_z^{i,j}$, $c_{oa}^j$, $c_{sr}^j$, $c_{hh}$, and $c_{dh}$ are the parameters. These parameters can also be referred to as coefficients.

$c_{ac}^{i,j}$ is a parameter related to the heat transfer to the zone j by air flowing from the zone i.

$c_z^{i,j}$ is a parameter related to the heat transfer by the temperature gradient between the zones i and j.

$c_{oa}^i$ is a parameter related to the heat transfer by the temperature gradient between the zone i and the outside air. Thus, a parameter related to the heat transfer by the temperature gradient between the focused zone j and the outside air is represented as $c_{oa}^j$.

$c_{sr}^i$ is a parameter related to the heat effect of solar radiation to the zone i. Thus, a parameter related to the heat effect of solar radiation to the focused zone j is represented as $c_{sr}^j$.

$c_{hh}$ is a parameter related to the heat effect of the heat emitted from a human body to a room temperature.

$c_{dh}$ is a parameter related to the heat effect of the heat emitted from an electric device to a room temperature.

Next, the meaning of each term of Expression (1) is described.

The left side of Expression (1) is the amount of change in temperature (a differential value of temperature) of the focused zone j. The temperature of the zone means the room temperature in the zone.

The first term on the right side of Expression (1) represents the heat transfer from the supply air to the other zones to the focused zone j.

The second term on the right side of Expression (1) represents the heat transfer between the focused zone j and the other zones.

The third term on the right side of Expression (1) represents the heat transfer between the focused zone j and the outside air.

The fourth term on the right side of Expression (1) represents the heat effect of solar radiation to the focused zone j.

The fifth term on the right side of Expression (1) represents the heat emitted from the human body to the focused zone j.

The sixth term on the right side of Expression (1) represents the heat emitted from the electric device to the focused zone j.

Figure 3:
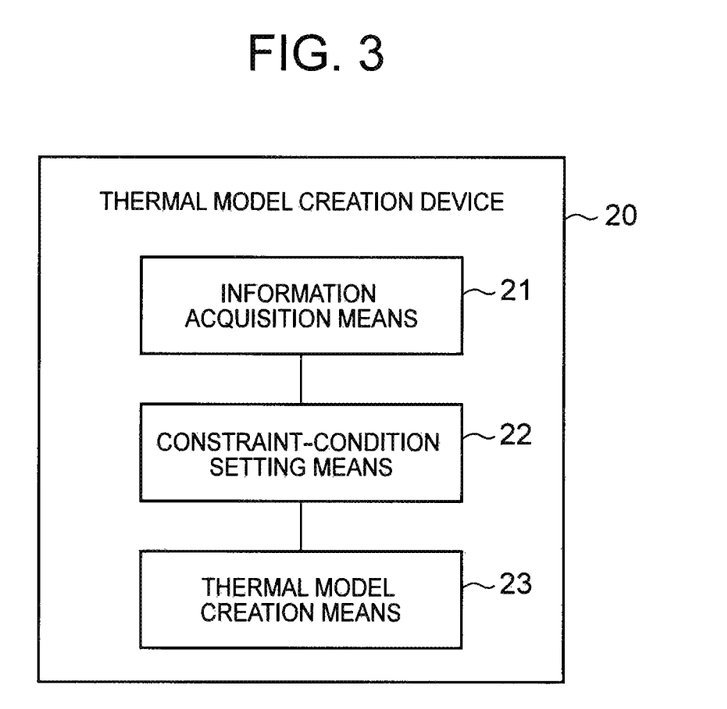
[FIG. 3] It depicts a block diagram showing a configuration example of a thermal model creation device of the present invention.

FIG. 3 depicts a block diagram showing a configuration example of the thermal model creation device of the present invention. A thermal model creation device 20 of the present invention includes an information acquisition means 21, a constraint-condition setting means 22, and a thermal model creation means 23.

The information acquisition means 21 accesses an external system storing information on a building having a floor a thermal model of which is to be created (for example, building information modeling (BIM)) to acquire the following information. The information acquired from the external system by the information acquisition means 21 includes information indicating adjacency relation between zones, information indicating whether each zone is a perimeter zone or a non-perimeter zone, information indicating whether each zone corresponds to "a zone surrounded by walls and having a door", and information on the characteristic value of a structure when the structure is provided on the outer periphery of a zone.

Figure 4:
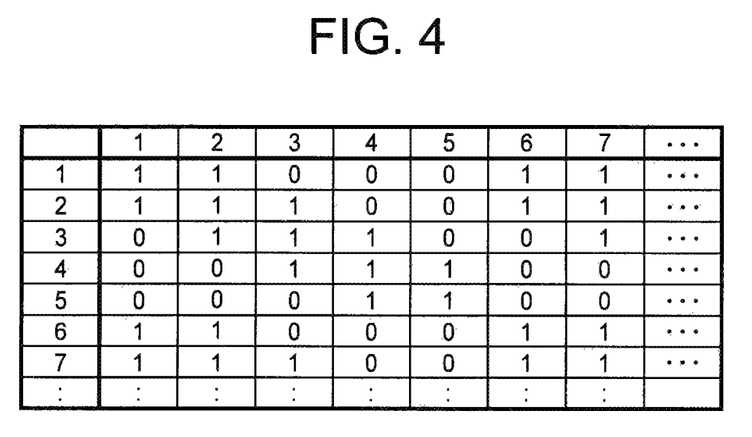
[FIG. 4] It depicts a schematic diagram showing an example of information indicating adjacency relation between zones.

Specifically, the information indicating the adjacency relation between zones is information indicating pairs of adjacent zones and pairs of non-adjacent zones. FIG. 4 depicts a schematic diagram showing an example of the information indicating adjacency relation between zones. FIG. 4 shows the adjacency relation between the zones shown in FIG. 1, but a part of the zones is omitted.

In FIG. 4, each number shown in the top row and each number shown in the leftmost column are the identification numbers of the zones. Thus, one row and one column represent the combination of the identification numbers of two zones. In the intersection of one row and one column, "1" or "0" is written as information indicating whether the two zones are adjacent or not. "1" means that the two zones are adjacent. "0" means that the two zones are not adjacent. For example, in the intersection of the row of the identification number "1" and the row of the identification number "2", "1" is written. This means that zones 1 and 2 are the zones adjacent to each other (see FIGS. 1 and 4). In addition, for example, in the intersection of the row of the identification number "4" and the row of the identification number "1", "0" is written. This means that zones 1 and 4 are not adjacent zones (see FIGS. 1 and 4).

In the example shown in FIG. 4, two zones that are in contact with each other only at the vertexes are regarded as adjacent zones. For example, the zones 3 and 7 shown in FIG. 1 are regarded as adjacent zones.

In the example shown in FIG. 4, an arbitrary zone is assumed to be adjacent to the zone itself. For example, the zone 1 is assumed to be adjacent to the zone 1.

Note that, the example shown in FIG. 4 shows the form based on an adjacency matrix as the form representing the adjacency relation between the zones, but the form representing the adjacency relation between the zones is not particularly limited. For example, the form representing the adjacency relation between the zones may be a form based on a neighbor list.

Figure 5:
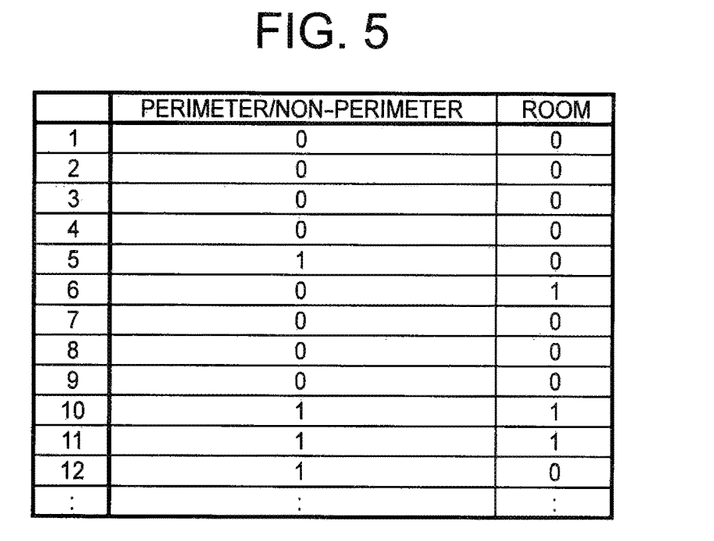
[FIG. 5] It depicts a schematic diagram showing an example of information indicating whether each zone is a perimeter zone or a non-perimeter zone, and information indicating whether each zone corresponds to "a zone surrounded by walls and having a door".

FIG. 5 depicts a schematic diagram showing an example of information indicating whether each zone is a perimeter zone or a non-perimeter zone and information indicating whether each zone corresponds to "a zone surrounded by walls and having a door". FIG. 5 corresponds to FIG. 1, but a part of the zones is omitted.

In FIG. 5, each number shown in the leftmost column is the identification number of each zone. In the second column from the left, "1" or "0" is written as a value indicating whether each zone is a perimeter zone or a non-perimeter zone. "1" means that the zone is a perimeter zone, and "0" means that the zone is a non-perimeter zone. FIG. 5 shows that the zones 5, 10, 11, 12, and the like are perimeter zones, and the zones 1 to 4 and 6 to 9 are non-perimeter zones (see FIGS. 1 and 5).

Furthermore, in the third column from the left in FIG. 5, "1" or "0" is written as a value indicating whether each zone corresponds to "a zone surrounded by walls and having a door". "1" means that the zone corresponds to "a zone surrounded by walls and having a door", and "0" means that the zone does not correspond to "a zone surrounded by walls and having a door". FIG. 5 shows that each of the zones 6, 10, 11, and the like corresponds "a zone surrounded by walls and having a door", and each of the zones 1 to 5, 7 to 9, 12, and the like does not correspond to "a zone surrounded by walls and having a door" (see FIGS. 1 and 5). The zone 1 shown in FIG. 1 does not have a wall at the boundary with the zone 2 and does not have a door, and does not correspond to "a zone surrounded by walls and having a door". The same applies to the zone 5.

The information acquisition means 21 further acquires, from the external system, information indicating between which zones the door is provided in the case of "a zone surrounded by walls and having a door". For example, the information acquisition means 21 further acquires information indicating that the door in the zone 6 shown in FIG. 1 is provided at the boundary with the zone 7. The information acquisition means 21 acquires similar information on the zones 10, 11, and 15. Note that, these pieces of information are omitted in FIG. 5.

Examples of the characteristic value of a structure provided on the outer periphery of a zone include the thickness, thermal conductivity, area, and the like of the wall and glass provided on the outer periphery of the zone. More specifically, the examples include the thickness, thermal conductivity, area, and the like of the wall and glass provided between the perimeter zone and the outside air.

Note that, the external system may store the above information and the information acquisition means 21 may directly acquire the above information from the external system. Alternatively, the information acquisition means 21 may acquire the above information by processing information stored in the external system in a form different from those of FIGS. 4, 5, and the like.

In addition, the thermal model creation device 20 may include, instead of the information acquisition means 21, an input interface (for example, an input device which is not shown) for an operator of the thermal model creation device 20 to input information. Then, the operator may create the above information and input the above information to the thermal model creation device 20 via the input interface.

The constraint-condition setting means 22 sets the constraint conditions of the parameters in the thermal model.

The constraint-condition setting means 22 sets the constraint conditions of the parameters in the thermal model according to the information acquired by the information acquisition means 21.

As a mode of setting the constraint conditions, there are, for example, a mode of setting a specific parameter to a fixed value, a mode of defining a magnitude relation of parameter values, and the like, but the mode of setting the constraint conditions is not limited thereto. Details of the operation when the constraint-condition setting means 22 sets the constraint conditions of the parameters according to the information acquired by the information acquisition means 21 will be described later.

The thermal model creation means 23 determines the thermal model by determining all values of the parameters in the thermal model under the constraint conditions set by the constraint-condition setting means 22.

More specifically, the actual value, at each time, of each explanatory variable included in Expression (1) is input to the thermal model creation means 23 from the operator of the thermal model creation device 20. The actual value includes the actual value of the zone temperature ($T^i(t)$). The thermal model creation means 23 obtains the actual value of the amount of change in temperature by calculating the difference of the actual values of the zone temperature ($T^i(t)$) at fixed time intervals (for example, at intervals of 15 minutes). This amount of change in temperature corresponds to the left side of Expression (1). The thermal model creation means 23 determines all unknown values of parameters in the thermal model by performing parameter estimation (for example, the least squares method) based on the actual value of each explanatory variable at each time and the actual value of the amount of change in temperature. Determining all values of the parameters in Expression (1) means that the thermal model has been created. By substituting the values of the explanatory variables at a future time into the thermal model, it is possible to calculate the amount of change in temperature of the zone from that time.

The information acquisition means 21, the constraint-condition setting means 22, and the thermal model creation means 23 are implemented by, for example, a CPU of a computer operating according to a thermal model creation program. In this case, the CPU is only required to load the thermal model creation program from a program recording medium such as a program storage device (not shown) of the computer, and to operate as the information acquisition means 21, the constraint-condition setting means 22, and the thermal model creation means 23 according to the program.

Figure 6:
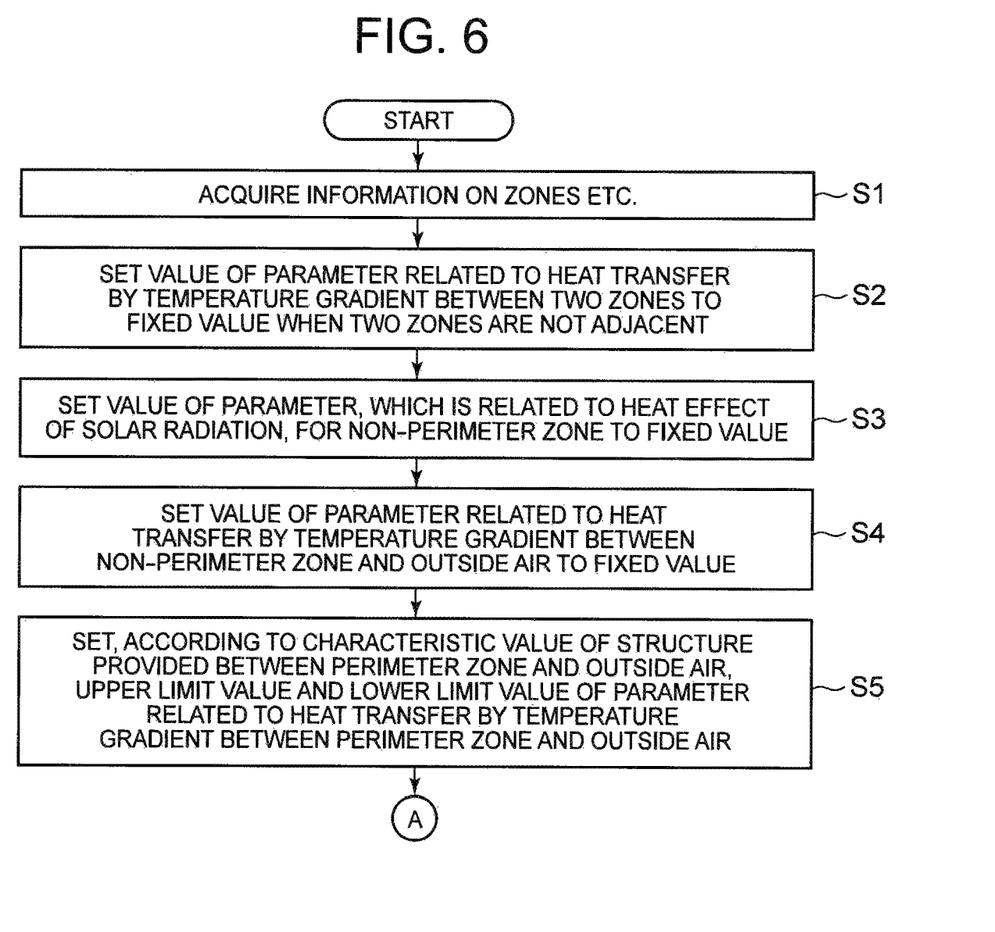
[FIG. 6] It depicts a flowchart showing an example of processing progress of the thermal model creation device of the present invention.
Figure 7:
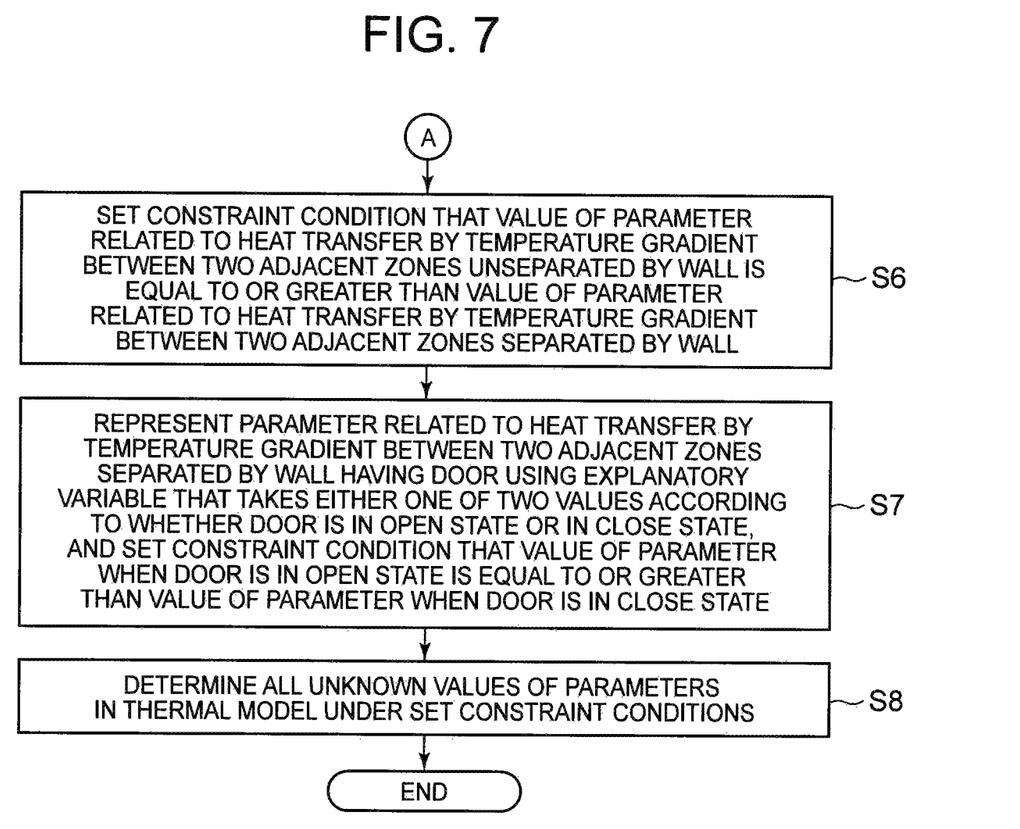
[FIG. 7] It depicts the flowchart showing an example of processing progress of the thermal model creation device of the present invention.

Next, the processing progress of the thermal model creation device of the present invention is described. FIGS. 6 and 7 depict a flowchart showing an example of the processing progress of the thermal model creation device of the present invention.

First, the information acquisition means 21 acquires, from the external system, the information indicating the adjacency relation between the zones, the information indicating whether each zone is a perimeter zone or a non-perimeter zone, the information indicating whether each zone corresponds to "a zone surrounded by walls and having a door", and the information on the characteristic value of a structure provided between the perimeter zone and the outside air (step S1).

The information acquisition means 21 acquires, for example, the information exemplified in FIG. 4 as the information indicating the adjacency relation between the zones. Furthermore, the information acquisition means 21 acquires, for example, the information exemplified in FIG. 5 as the information indicating whether each zone is a perimeter zone or a non-perimeter zone, and the information indicating whether each zone corresponds to "a zone surrounded by walls and having a door". As described above, the information acquisition means 21 further acquires the information indicating between which zones the door is provided in the case of "a zone surrounded by walls and having a door". The information acquisition means 21 further acquires, for example, the thickness, thermal conductivity, area, and the like of the wall and glass provided between the perimeter zone and the outside air as the information on the characteristic value of a structure provided between the perimeter zone and the outside air.

In step S1, the information acquisition means 21 may extract the above information by processing the information stored in the external system.

The information acquisition means 21 transmits the information acquired in step S1 to the constraint-condition setting means 22.

The constraint-condition setting means 22 sets, based on the information, various constraint conditions of the parameters in steps S2 to S7 to be described later.

The constraint-condition setting means 22 sets the value of the parameter related to the heat transfer by the temperature gradient between two zones to a fixed value when the two zones are not adjacent (step S2). The constraint-condition setting means 22 may use, for example, "0" as the fixed value in step S2.

For example, the zones 7 and 9 shown in FIG. 1 are not adjacent. Thus, the constraint-condition setting means 22 sets "$c_z^{7,9}=0$". The constraint-condition setting means 22 performs similar processing for each pair of two non-adjacent zones. Note that, using "0" as the fixed value in step S2 means that the heat transfer coefficient between the two non-adjacent zones is regarded as "0".

The constraint-condition setting means 22 is only required to identify each pair of two non-adjacent zones based on the information indicating the adjacency relation between the zones (for example, the information exemplified in FIG. 4).

Next, the constraint-condition setting means 22 sets the value of the parameter, which is related to the heat effect of solar radiation, for a non-perimeter zone to a fixed value (step S3). The constraint-condition setting means 22 may use, for example, "0" as the fixed value in step S3.

For example, the zone 8 shown in FIG. 1 is the non-perimeter zone. Thus, the constraint-condition setting means 22 sets "$c_{sr}^8=0$". The constraint-condition setting means 22 performs similar processing for each zone corresponding to the non-perimeter zone. Note that, using "0" as the fixed value in step S3 means that there is no heat effect of solar radiation to the non-perimeter zone.

The constraint-condition setting means 22 is only required to identify each zone corresponding to the non-perimeter zone based on the information indicating whether each zone is a perimeter zone or a non-perimeter zone (for example, the information exemplified in FIG. 5). The same applies to step S4 to be described later.

Next, the constraint-condition setting means 22 sets the value of the parameter related to the heat transfer by the temperature gradient between the non-perimeter zone and the outside air to a fixed value (step S4). The constraint-condition setting means 22 may use, for example, "0" as the fixed value in step S4.

For example, the zone 8 shown in FIG. 1 is the non-perimeter zone. Thus, the constraint-condition setting means 22 sets "$c_{oa}^8=0$". The constraint-condition setting means 22 performs similar processing for each zone corresponding to the non-perimeter zone. Note that, using "0" as the fixed value in step S4 means that the heat transfer coefficient between the non-perimeter zone and the outside air is regarded as "0".

It can be said that the processing in steps S3 and S4 is processing for setting the value of a predetermined parameter for the non-perimeter zone to a fixed value.

Next, the constraint-condition setting means 22 sets, according to the characteristic value of the structure provided between the perimeter zone and the outside air, the upper limit value and the lower limit value of the parameter related to the heat transfer by the temperature gradient between the perimeter zone and the outside air (step S5).

For example, the zone 13 shown in FIG. 1 is the perimeter zone. The upper limit value and the lower limit value of the parameter related to the heat transfer by the temperature gradient between the zone 13 and the outside air are referred to as "$c_{oa\_upper}^{13}$" and "$c_{oa\_lower}^{13}$" respectively. The constraint-condition setting means 22 is only required to calculate $c_{oa\_upper}^{13}$ and $c_{oa\_lower}^{13}$ using the thickness, thermal conductivity, and area of the structure (for example, a wall, glass, and the like) provided between the zone 13 and the outside air. This calculation method may be a well-known calculation method. Here, it is assumed that $c_{oa\_lower}^{13}=0$. Using the calculation result, the constraint-condition setting means 22 sets a constraint condition that $0 \leq c_{oa}^{13} \leq c_{oa\_upper}^{13}$. The constraint-condition setting means 22 performs similar processing for each zone corresponding to the perimeter zone.

The constraint-condition setting means 22 is only required to identify each zone corresponding to the perimeter zone based on the information indicating whether each zone is a perimeter zone or a non-perimeter zone (for example, the information exemplified in FIG. 5).

Next, the constraint-condition setting means 22 sets a constraint condition that the value of the parameter related to the heat transfer by the temperature gradient between two adjacent zones unseparated by a wall is equal to or greater than the value of the parameter related to the heat transfer by the temperature gradient between the two adjacent zones separated by a wall (step S6).

For example, there is a wall between the zones 6 and 7 shown in FIG. 1. The parameter related to the heat transfer by the temperature gradient between the zone 6 and 7 is $c_z^{6,7}$. There is no wall between the zones 7 and 8 shown in FIG. 1. The parameter related to the heat transfer by the temperature gradient between the zones 7 and 8 is $c_z^{7,8}$. Thus, the constraint-condition setting means 22 sets a constraint condition that $c_z^{6,7} \leq c_z^{7,8}$. The constraint-condition setting means 22 performs similar processing for each pair of two adjacent zones separated by a wall and of two adjacent zones unseparated by a wall.

The constraint-condition setting means 22 is only required to identify each pair of two adjacent zones separated by a wall and each pair of two adjacent zones unseparated by a wall based on the information indicating the adjacency relation between the zones (for example, the information exemplified FIG. 4) and the information indicating whether each zone corresponds to "a zone surrounded by walls and having a door" (for example, the information exemplified in FIG. 5) respectively.

In step S6, the constraint condition that the heat transfer coefficient between the two zones with no wall therebetween is equal to or greater than the heat transfer coefficient between the two zones with a wall therebetween is determined.

Next, the constraint-condition setting means 22 represents the parameter related to the heat transfer by the temperature gradient between the two adjacent zones separated by a wall having a door using an explanatory variable that takes either one of two values according to whether the door is in the open state or in the close state. The constraint-condition setting means 22 further sets a constraint condition that the value of the parameter when the door is in the open state is equal to or greater than the value of the parameter when the door is in the close state (step S7).

The constraint-condition setting means 22 identifies two adjacent zones separated by a wall having a door based on the information indicating between which zones the door is provided in the case of "a zone surrounded by walls and having a door".

Then, when there is a wall having a door between the adjacent zones p and q, an explanatory variable that takes either one of two values according to whether the door is in the open state or in the close state is represented as "$b_d^{p,q}$". When the door between the zones p and q is in the open state, it is assumed that $b_d^{p,q}=1$. When the door between the zones p and q is in the close state, it is assumed that $b_d^{p,q}=0$.

The value of the parameter $c_z^{p,q}$ related to the heat transfer by the temperature gradient between the zones p and q varies according to whether the door between the zones p and q is in the open state or in the close state. The parameter when the door is in the open state is represented as "$c_{z\_open}^{p,q}$". The parameter when the door is in the close state is represented as "$c_{z\_close}^{p,q}$". The constraint-condition setting means 22 represents the parameter $c_z^{p,q}$ related to the heat transfer by the temperature gradient between the adjacent zones p and q using the above explanation variable $b_d^{p,q}$ as the following Expression (2). Expression (2) is a constraint condition.

$$c_z^{p,q}=b_d^{p,q}c_{z\_open}^{p,q}+(1-b_d^{p,q})c_{z\_close}^{p,q} \qquad (2)$$

Thus, $c_z^{p,q}$ is represented by the binary explanatory variable of $b_d^{p,q}$ and the two parameters $c_{z\_open}^{p,q}$ and $c_{z\_close}^{p,q}$.

The constraint-condition setting means 22 further sets a constraint condition that $c_{z\_open}^{p,q} \geq c_{z\_close}^{p,q}$. This constraint condition means that the heat transfer coefficient when the door is opened is equal to or greater than the heat transfer coefficient when the door is closed.

For example, the zones 6 and 7 shown in FIG. 1 are separated by a wall having a door. The parameter related to the heat transfer between the two zones 6 and 7 is $c_z^{6,7}$. In this case, the constraint-condition setting means 22 sets constraint conditions that $c_z^{6,7}=b_d^{6,7}c_{z\_open}^{6,7}+(1-b_d^{6,7})c_{z\_close}^{6,7}$ and $c_{z\_open}^{6,7} \geq c_{z\_close}^{6,7}$.

The constraint-condition setting means 22 performs similar processing for each pair of two adjacent zones separated by a wall having a door.

Next, the thermal model creation means 23 creates a thermal model by determining all unknown values of parameters in the thermal model under the constraint conditions set in steps S2 to S7 (step S8).

The actual value, at each time, of each explanatory variable included in Expression (1) is input to the thermal model creation means 23 from the operator of the thermal model creation device 20. In addition, the actual value of the binary explanatory variable $b_d^{p,q}$ representing the state (open state or close state) of each door at each time is input to the thermal model creation means 23 by the operator. Here, the binary explanatory variable $b_d^{p,q}$ may be an unknown parameter without inputting the actual value. That is, the actual value of the state (open state or close state) of each door at each time may not be input and may be treated as an unknown parameter, and the value of $b_d^{p,q}$ may be determined. The timing at which the actual value is input is not particularly limited as long as the timing is before execution of step S8. The thermal model creation means 23 obtains, for each zone, the actual value of the amount of change in temperature by calculating the difference of the actual values of the zone temperature ($T^i(t)$) at fixed time intervals (for example, at intervals of 15 minutes).

The thermal model creation means 23 determines all unknown values of the parameters in the thermal model by performing parameter estimation (for example, the least squares method) based on the input actual value, at each time, of each explanatory variable and the actual value of the amount of change in temperature. As a result, the thermal model is obtained.

According to the present exemplary embodiment, the constraint-condition setting means 22 sets the constraint conditions of the parameters in the thermal model. Then, the thermal model creation means 23 determines the unknown values of parameters in the thermal model under the constraint conditions. Since the unknown values of the parameters are determined under the constraint conditions, it is possible to prevent combinations of values of parameters that cancel each other from being derived. As a result, it is possible for the thermal model creation device 20 to create a highly accurate thermal model.

For example, in steps S2 to S4, the values of some parameters are set to fixed values. As a result, it is possible to reduce the number of parameters the values of which are unknown, and to prevent combinations of values of parameters that cancel each other from being derived. In particular, the number of parameters corresponding to combinations of zones (for example, $c_z^{ij}$) is very large, but it is possible to set some of the parameters to fixed values in step 2, and to greatly reduce the number of parameters the values of which are unknown.

The order of the processing in steps S2 to S7 is not particularly limited.

In addition, the constraint-condition setting means 22 may execute only some of steps S2 to S7 as the processing for setting the constraint conditions. For example, the constraint-condition setting means 22 may execute only any one of steps S2 to S7. Alternatively, the constraint-condition setting means 22 may execute only any two of steps S2 to S7. Alternatively, the constraint-condition setting means 22 may execute only any three of steps S2 to S7. Alternatively, the constraint-condition setting means 22 may execute only any four of steps S2 to S7. Alternatively, the constraint-condition setting means 22 may execute only any five of steps S2 to S7.

With the thermal model obtained in the above-described manner, it is possible to predict the temperature of each zone in the future. Expression (3) shown below is an example of a prediction expression for obtaining a predicted value of the temperature of the zone j in the future.

[Expression 2]

$$T^j(t + \Delta t) = \qquad (3)$$

$$T^j(t) + \Delta t \cdot \left\{ \sum_{i \in Z} c_{ac}^{i,j} Q_{ac}^i(t)(T_{ac}^i(t) - T^j(t)) + \sum_{i \in Z} c_z^{i,j}(T^i(t) - T^j(t)) + \right.$$

$$\left. c_{oa}^j(T_{oa}(t) - T^j(t)) + c_{sr}^j I(t) + c_{hh} O^j(t) + c_{dh} E^j(t) \right\}$$

The first term ($T^j(t)$) on the right side of Expression (3) is the temperature of the zone j at time t. $T^j(t)$ is given as an initial value. $\Delta t$ on the right side of Expression (3) represents a fixed time. Thus, by substituting the value of the explanatory variable at a desired future time into Expression (3), it is possible to calculate the temperature $T^j(t+\Delta t)$ of the zone j after the fixed time. Furthermore, by using the temperature as the initial value $T^j(t)$, it is possible to sequentially calculate the future temperatures of the zone j. That is, it is possible to obtain the predicted value of the future temperature of the zone j.

As the values of the explanatory variables $T_{oa}(t)$ and $I(t)$ at a future time, predicted values obtained by, for example, weather forecasts can be used. Similarly, predicted values can be used as the values of $O^j(t)$ and $E^j(t)$ at the future time.

In addition, $Q_{ac}^i(t)$ and $T_{ac}^i(t)$ are explanatory variables representing controllable events. Thus, desired values can be used as $Q_{ac}^i(t)$ and $T_{ac}^i(t)$ at the future time.

Furthermore, by setting the temperature of the zone j at the future time to a desired temperature, it is also possible to obtain the values of $Q_{ac}^i(t)$ and $T_{ac}^i(t)$ at the future time. Thus, by controlling $Q_{ac}^i(t)$ and $T_{ac}^i(t)$ at each future time to those values, it is possible to set the temperature of the zone j at a future time to the desired temperature.

Furthermore, by controlling air conditioning based on the thermal model created by the thermal model creation device 20 and the model of the air conditioner, it is possible to improve the efficiency of the air-conditioning energy of the building. As a result, it is possible to obtain a large energy saving effect.

Moreover, it has been exemplified that the air conditioning system includes the AHU 61 and the VAV 62 in the above exemplary embodiment, but the present invention does not depend on the configuration of an air conditioning system. Specifically, the present invention can be applied to a case in which the air conditioning system is a package type air conditioner. This is because the package type air conditioner can simultaneously control the supply air temperature and the supply air volume and one package type air conditioner can be handled equivalently to the AHU 61 and the VAV 62.

In addition, it has been described that Expression (1) is an example of the expression indicating the temperature change of each zone in the above exemplary embodiment, but the form of the expression indicating the temperature change of each zone is not limited to Expression (1). The expression indicating the temperature change of each zone is only required to be a mathematical model that represents the temperature change of a zone, has at least the zone temperature, the supply air temperature, the supply air volume, the outside air temperature, the solar radiation amount, and the internal thermal load as explanatory variables, and represents at least the heat transfer between the zones, the heat transfer between the supply air and a zone, the heat transfer between the outside air and a zone, the heat effect by solar radiation, and the heat effect by the internal heat load.

For example, the present invention can be applied to a mathematical model in which explanatory variables of the average temperatures of the wall, floor, and ceiling of a zone is introduced and a term related to the heat transfer with a zone temperature by a temperature gradient is added to Expression (1).

Figure 8:
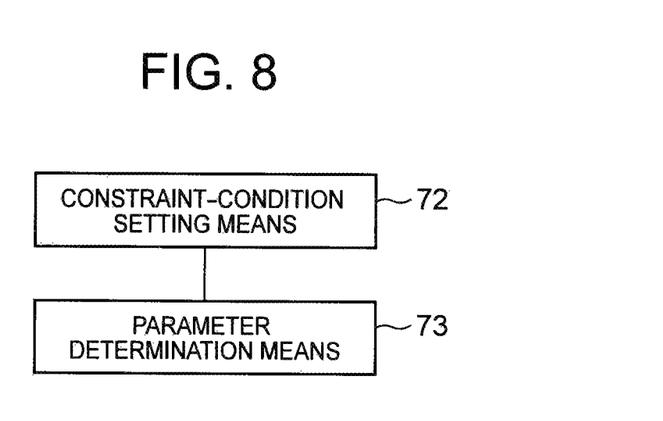
[FIG. 8] It depicts a block diagram showing an outline of the thermal model creation device of the present invention.

Next, the outline of the present invention is described. FIG. 8 depicts a block diagram showing the outline of the thermal model creation device of the present invention. The thermal model creation device of the present invention includes a constraint-condition setting means 72 and a parameter determination means 73.

The constraint-condition setting means 72 (for example, the constraint-condition setting means 22) sets constraint conditions of parameters in a thermal model.

The parameter determination means 73 (for example, the thermal model creation means 23) determines all unknown values of parameters in the thermal model under the constraint conditions.

With such a configuration, it is possible to create a highly accurate thermal model.

The above exemplary embodiment of the present invention can be also described as follows, but is not limited to the following.

(Supplementary Note 1)

A thermal model creation device that creates a thermal model representing temperature changes of zones using numerical expressions including explanatory variables and parameters, the device including:

a constraint-condition setting means for setting constraint conditions of the parameters in the thermal model; and a parameter determination means for determining all unknown values of parameters in the thermal model under the constraint conditions.

(Supplementary Note 2)

The thermal model creation device according to supplementary note 1, in which the constraint-condition setting means sets a constraint condition including either one or both of one or more inequalities representing possible ranges that one or more unknown parameters take and one or more relational expressions related to one or more unknown parameters.

(Supplementary Note 3)

The thermal model creation device according to supplementary note 1 or 2, in which the constraint-condition setting means sets a value of a parameter related to heat transfer between two zones to a fixed value when the two zones are not adjacent.

(Supplementary Note 4)

The thermal model creation device according to any one of supplementary notes 1 to 3, in which the constraint-condition setting means sets a value of a predetermined parameter for a non-perimeter zone to a fixed value.

(Supplementary Note 5)

The thermal model creation device according to any one of supplementary notes 1 to 4, in which the constraint-condition setting means sets a value of a parameter, which is related to a heat effect of solar radiation, for the non-perimeter zone to a fixed value.

(Supplementary Note 6)

The thermal model creation device according to any one of supplementary notes 1 to 5, in which the constraint-condition setting means sets a value of a parameter related to heat transfer between the non-perimeter zone and outside air to a fixed value.

(Supplementary Note 7)

The thermal model creation device according to any one of supplementary notes 1 to 6, in which the constraint-condition setting means sets, according to a characteristic of a structure provided between a perimeter zone and outside air, an upper limit value and a lower limit value of a parameter related to heat transfer between the perimeter zone and the outside air.

(Supplementary Note 8)

The thermal model creation device according to any one of supplementary notes 1 to 7, in which the constraint-condition setting means sets a constraint condition that a value of a parameter related to heat transfer between two adjacent zones unseparated by a wall is equal to or greater than a value of a parameter related to heat transfer between two adjacent zones separated by a wall.

(Supplementary Note 9)

The thermal model creation device according to any one of supplementary notes 1 to 8, in which the constraint-condition setting means represents a parameter related to heat transfer between two adjacent zones separated by a wall having a door using an explanatory variable taking either one of two values depending on whether the door is in an open state or in a close state, and sets a constraint condition that a value of the parameter when the door is in the open state is equal to or greater than a value of the parameter when the door is in the close state.

The present invention has been described with reference to the exemplary embodiment, but is not limited to the above exemplary embodiment. Various changes that can be understood by those skilled in the art within the scope of the present invention can be made to the configuration and details of the present invention.

This application claims priority based on Japanese Patent Application No. 2016-070979 filed on Mar. 31, 2016, the disclosure of which is incorporated herein in its entirety.

INDUSTRIAL APPLICABILITY

The present invention is suitably applied to a thermal model creation device that creates a thermal model representing a temperature change of a zone defined by air conditioning zoning.

REFERENCE SIGNS LIST

20 Thermal model creation device
21 Information acquisition means
22 Constraint-condition setting means
23 Thermal model creation means

What is claimed is:

1. An air conditioner system comprising:
an air conditioner including a thermal model creation device configured to control the air conditioner according to a thermal model created thereby, the thermal model representing temperature changes of zones using numerical expressions including explanatory variables and parameters, the thermal model creation device comprising:
at least one processor configured to:
set constraint conditions of the parameters in the thermal model; and
determine all unknown values of the parameters in the thermal model under the constraint conditions,
wherein the at least one processor is configured to:
represent a first parameter related to heat transfer between two adjacent zones separated by a wall having a door using a first explanatory variable taking either of one of two values depending on whether the door is in an open state or in a close state, and set a constraint condition such that a value of the first parameter when the door is in the open state is equal to or greater than a value of the first parameter when the door is in the close state,
wherein the first explanatory variable takes either of one of the two values depending on whether the door is in an open state or in a close state, and is treated as an unknown parameter,
wherein the first parameter is represented as: $c = bc_{\_open} + (1-b)c_{\_close}$, where, c denotes the first parameter, b denotes the first explanatory variable, $c_{\_open}$ denotes c when the door is in the open state, and $c_{\_close}$ denotes c when the door is in the close state, and
wherein the air conditioner system sets a temperature of a zone according to a desired temperature according to an air volume supply and a temperature of the air volume supply generated by the thermal model creation device.

2. The thermal model creation device according to claim 1,
wherein the at least one processor is further configured to set a constraint condition including either one or both of one or more inequalities representing possible ranges that one or more unknown parameters take and one or more relational expressions related to one or more unknown parameters.

3. The thermal model creation device according to claim 1,
wherein the at least one processor is further configured to:
set a value of a parameter related to heat transfer between two zones to a fixed value when the two zones are not adjacent.

4. The thermal model creation device according to claim 1,
wherein the at least one processor is further configured to:
set a value of a predetermined parameter for a non-perimeter zone to a fixed value,
wherein the non-perimeter zone is a zone other than a perimeter zone that is a zone that is provided with a glass between the zone and outside air.

5. The thermal model creation device according to claim 1,
wherein the at least one processor is further configured to:
set a value of a parameter, which is related to a heat effect of solar radiation, for a non-perimeter zone to a fixed value,
wherein the non-perimeter zone is a zone other than a perimeter zone that is a zone that is provided with a glass between the zone and outside air.

6. The thermal model creation device according to claim 1,
wherein the at least one processor is further configured to:
set a value of a parameter related to heat transfer between a non-perimeter zone and outside air to a fixed value,
wherein the non-perimeter zone is a zone other than a perimeter zone that is a zone that is provided with a glass between the zone and outside air.

7. The thermal model creation device according to claim 1,
wherein the at least one processor is further configured to:
set, according to a characteristic of a structure provided between a perimeter zone and outside air, an upper limit value and a lower limit value of a parameter related to heat transfer between the perimeter zone and the outside air,
wherein the perimeter zone is a zone that is provided with a glass between the zone and outside air.

8. The thermal model creation device according to claim 1,
wherein the at least one processor is further configured to:
set a constraint condition that a value of a parameter related to heat transfer between two adjacent zones unseparated by a wall is equal to or greater than the value of the first parameter related to heat transfer between two adjacent zones separated by the wall.

9. A method for controlling an air conditioner system according to a thermal model, the method comprising:
creating the thermal model representing temperature changes of zones using numerical expressions including explanatory variables and parameters, and creating if the thermal model includes:
setting constraint conditions of the parameters in the thermal model; and
determining all unknown values of the parameters in the thermal model under the constraint conditions,
wherein the setting of the constraint conditions includes, representing a first parameter related to heat transfer between two adjacent zones separated by a wall having a door using a first explanatory variable taking either of one of two values depending on whether the door is in an open state or in a close state, and setting a constraint condition such that a value of the first parameter when the door is in the open state is equal to or greater than a value of the first parameter when the door is in the close state,
wherein the first explanatory variable takes either of one of the two values depending on whether the door is in an open state or in a close state, and is treated as an unknown parameter,
wherein the first parameter is represented as: $c = b c_{\_open} + (1-b) c_{\_close}$ where, $c$ denotes the first parameter, $b$ denotes the first explanatory variable, $c_{\_open}$ denotes $c$ when the door is in the open state, and $c_{\_close}$ denotes $c$ when the door is in the close state, and
wherein the method for controlling an air conditioner system includes setting a temperature of a zone according to a desired temperature according to an air volume supply and a temperature of the air volume supply generated by the thermal model creation device.

10. A non-transitory computer-readable recording medium storing computer executable code, which when executed causes a computer including at least one processor to control an air conditioning system according to a thermal model created by the computer executable code, the computer executable code including:
thermal model creation code configured to cause the at least one processor to create the thermal model, the thermal model representing temperature changes of zones using numerical expressions including explanatory variables and parameters,
constraint condition setting code configured to set constraint conditions of the parameters in the thermal model; and
parameter determination processing code configured to cause the at least one processor to determine all unknown values of parameters in the thermal model under the constraint conditions,
wherein the constraint condition setting code is configured to execute processing, such that a first parameter related to heat transfer between two adjacent zones separated by a wall having a door is represented using a first explanatory variable taking either of one of two values depending on whether the door is in an open state or in a close state, and a value of the first parameter when the door is in the open state is equal to or greater than a value of the first parameter when the door is in the close state,
wherein the first explanatory variable taking either of one of the two values depending on whether the door is in an open state or in a close state is treated as an unknown parameter, and
wherein the first parameter is represented as $c = b c_{\_open} + (1-b) c_{\_close}$, where, $c$ denotes the first parameter, $b$ denotes the first explanatory variable, $c_{\_open}$ denotes $c$ when the door is in the open state, and $c_{\_close}$ denotes $c$ when the door is in the close state, and
wherein the computer executable code includes setting code configured to set a temperature of a zone according to a desired temperature according to an air volume supply and a temperature of the air volume supply generated by the thermal model creation device.

* * * * *